United States Patent Office 2,694,665
Patented Nov. 16, 1954

2,694,665

PROCAINE-PENICILLIN G COMPOSITION

Robert E. Himelick, Kalamazoo, Mich., assignor to The Upjohn Company, Kalamazoo, Mich., a corporation of Michigan No Drawing. Application August 3, 1949,
Serial No. 108,419

6 Claims. (Cl. 167—58)

This invention relates to a composition suitable for the extemporaneous preparation of aqueous suspensions, containing the procaine salt of penicillin G and a monoaminomonophospholipids, such as lecithin, cephalin, and the like.

Aqueous suspensions of therapeutic agents are well known in the medicinal art, and their utility is well established. However, the rather slow but well-defined destructive effect of water upon the therapeutic activity of procaine-penicillin G prevents its storage in water for any extended period of time. It is not possible, therefore, to prepare stable aqueous suspensions of procaine-penicillin G and distribute them through the usual commercial channels, since this procedure usually involves at least several weeks, and the preparation would be therapeutiaclly ineffective at the time of intended use.

Satisfactory aqueous suspensions of procaine-penicillin G cannot be prepared using water alone. Agitation, in water alone, of finely divided procaine-penicillin G of the size necessary for the preparation of aqueous suspensions, results in a large amount of froth. Entrapment of air and procaine-penicillin G particles by the froth makes it impossible to obtain accurate or uniform doses from a multiple injection vial. Moreover, suspended particles cling to the walls of the container, preventing satisfactory withdrawal of suspension therefrom, and also causing the plunger of a hypodermic syringe to "freeze," rendering further injection from that hypodermic syringe impossible.

Many suspending agents, such as gelatin, pectin, tragacanth, and sodium carboxymethylcellulose, have been suggested without success in an attempt to overcome these difficulties. Suspensions of penicillin G made with gelatin or pectin settle rapidly and are difficult to sterilize, since heat destroys their suspension-stabilizing properties as well as the therapeutic effectiveness of procaine-penicillin G, and other methods of sterilization, such as filtration, are not suitable. Further, the "freezing" of a hypodermic syringe is not completely eliminated by these agents. Tragacanth and sodium carboxymethylcellulose suspensions are so difficult to sterilize, by either heat or filtration, that their use is not practicable. The slow rate of solution of sodium carboxymethylcellulose in water is also a disadvantage attending the employment of this agent; since it is necessary to prepare any aqueous suspension of procaine-penicillin G immediately prior to use, due to its water-instability, consequently, the suspending agents employed in the composition should be readily soluble in water or be such as readily produce a stable aqueous suspension of procaine-penicillin G.

It is an object of the present invention to provide a sterile composition of procaine-penicillin G, which is readily convertible to an aqueous suspension which does not froth on agitation or freeze in a hypodermic syringe. It is a further object of this invention to provide a novel composition suitable for the extemporaneous preparation of aqueous suspensions of procaine-penicillin G, which suspensins are useful for the injection administration of aqueous procaine-penicillin G in accurate and uniform dosages. Another object of this invention is the provision of a novel composition of matter containing procaine-penicillin G and at least one monoaminomonophospholipids. Other objects will become apparent hereinafter.

The term "monoaminomonophospholipids," as used in this specification and the appended claims, is intended to include lecithin (both the alpha and beta forms), partially hydroxylated lecithin, cephalin (both the alpha and beta forms), and partially hydroxylated cephalin, and mixtures thereof, such phospholipids containing not more than one nitrogen atom.

The partially hydroxylated lecithin and cephalin are formed by the introduction of hydroxyl groups into the double bond of the oleic or other unsaturated fatty acid present in the monoaminomonophospholipids molecule. A preferred embodiment of this invention contemplates the use of a mixture of lecithin and cephalin, and their partially hydroxylated derivatixes, obtained from soybean oil, such as the representative "Gliddenol HG," a product of The Glidden Company, Chicago, Illinois.

The composition of the present invention consists of particles of procaine-penicillin G coated with at least one monoaminomonophospholipids. The coating on the procaine-penicillin G particles need not be uniform, or complete, nor does all of the phospholipid present in the composition need to be coated on the penicillin G. For satisfactory use, it is only necessary to obtain a sufficient coating of the procaine-penicillin G particles to cause a local strong concentration of the monoaminomonophospholipids suspending agent, so as to produce an immediate suspension of the particles. Any suspending agent not coated on the particles, being rapidly soluble, will bring the final concentration of the suspending agent to within the desired range and stabilize the suspension for the duration of the therapeutic efficacy of the procaine-penicillin G.

The composition of this invention can be readily prepared by dissolving a monoaminomonophospholipids in a low-boiling organic solvent, such as chloroform, petroleum ether, carbon tetrachloride, and the like, filtering the solution through a sterilization filter of the Seitz or Berkfeld type, mixing the same thoroughly with powdered procaine-penicillin G, and evaporating the solution at a temperature which is not detrimental to the therapeutic effectiveness of procaine-penicillin G, preferably below 50 degrees centigrade and under reduced pressure. The brittle mass thus obtained is milled to a particle size which will pass through a 60-mesh screen or finer. This fine powder is suitable for filling sterile vials, which can then be stored until needed. Thus-obtained crystalline particles of procaine-penicillin G, coated with a monoaminomonophospholipids, can be quickly suspended in water by agitation with a measured volume of water. For example, when 1,732,500 units of this penicillin-monoaminomonophospholipids powder was placed in a vial with four milliliters of water and agitated, it was possible to withdraw five uniform one-milliliter therapeutically useful doses of procaine-penicillin G containing 300,000 units per milliliter without freezing of the syringe or other difficulty of administration. When a similar amount of procaine-penicillin G of the same particle size, without the particular suspending agent of the present invention, was placed in a vial with four milliliters of water and shaken to effect suspension, seven frothy one-milliliter portions were obtained due to the incorporation of almost two milliliters of air. Upon standing a few seconds, a hypodermic syringe containing the frothed suspension "froze" so tightly that it was broken in an attempt to loosen the plunger for administration of the suspension.

The amount of monoaminomonophospholipids employed may be varied between one and ten percent by weight of dry procaine-penicillin G powder, the preferred concentration being about 7.4 percent. Lower concentrations of the monoaminomonophospholipids give a satisfactory suspensoin, but, since it has been found that the presence of monoaminomonophospholipids enhances the delayed absorption of procaine-penicillin G, the higher concentrations are desirable, and the exact amount is limited only by the increased viscosity of the aqueous suspensions when higher concentrations are used.

The composition has been described as suitable for suspension in pure distilled water. For the purpose of human administration, however, it is the custom of those skilled in the art to employ physiological saline solution in place of distilled water. It is, therefore, to be understood that the composition of the present invention is suitable for the preparation of suspensions using either water or physiological saline solution with equal facility.

The following example is illustrative of the practice of the present invention, but is not to be construed as limiting:

Example

A sterile chloroform solution is prepared by dissolving 24 grams of a partially hydroxylated soya lecithin-cephalin monoaminomonophospholipids mixture (Gliddenol HG) in sufficient chloroform to make 300 milliliters of solution and filtering through a Seitz filter pad. Two hundred grams of microcrystalline procaine-penicillin G is added to 200 milliliters of the sterile chloroform solution and the mixture stirred until the crystals have been thoroughly wetted. The chloroform is then removed by heating the solution at a temperature of 40–50 degrees centigrade under reduced pressure, and the resulting brittle mass is ground, under sterile conditions, to a particle size which passes a 60-mesh, or finer, screen. The resulting composition contains 7.4 percent of the lecithin-cephalin monoaminomonophospholipids, and is suitable for filling sterile vials. Vials containing the powder can be stored for long periods of time without loss of potency. When it is desired to administer the penicillin G in suspension form, a desired amount of water is merely added and the mixture agitated. The resulting suspension does not froth, cling to the sides of the container, or cause freezing of the hypodermic syringe plunger, but allows administration of uniform dosages without difficulty, as previously indicated.

The percentage of monoaminomonophospholipids in the final composition may be varied by varying the amount of a standard solution of the monoaminomonophospholipids in chloroform or other organic solvent. When 200 grams of procaine-penicillin G is mixed with fifty milliliters of the standard chloroform solution used in the above example, and the solvent removed, a composition is obtained containing 1.96 percent of monoaminomonophospholipids. When 250 milliliters of the above chloroform solution is used with 200 grams of procaine-penicillin G, the composition contains 9.1 percent of monoaminomonophospholipids. These compositions are useful in the same manner, and their use is attended by the same advantages, as described for the composition of the example.

It is to be understood that this invention is not to be limited to the exact methods and compositions hereinbefore described, since obvious modifications and equivalents will be apparent to one skilled in the art in accord with the principles declared herein, and it is therefore to be understood that I limit myself only as defined in the appended claims.

I claim:

1. A composition suitable for the extemporaneous preparation of an aqueous suspension of procaine-penicillin G, including: procaine-penicillin G particles coated at least in part with at least one phospholipid containing not more than one nitrogen atom.

2. A composition suitable for the extemporaneous preparation of an aqueous suspension of procaine-penicillin G, including: procaine-penicillin G particles coated at least in part with at least one phospholipid containing not more than one nitrogen atom, said composition being of a particle size sufficiently small to pass a sixty-mesh screen.

3. A composition suitable for the extemporaneous preparation of an aqueous suspension of procaine-penicillin G, including: ninety to ninety-nine percent of procaine-penicillin G particles and ten percent to one percent of at least one phospholipid containing not more than one nitrogen atom, said phospholipid being at least in part coated on the procaine-penicillin G particles.

4. A composition suitable for the extemporaneous preparation of an aqueous suspension of procaine-penicillin G, including about 92.6 parts of procaine-penicillin G and about 7.4 parts of a partially hydroxylated soy lecithin-cephalin phospholipid mixture, said phospholipid mixture being coated on the surface of the procaine-penicillin G particles.

5. A composition suitable for the extemporaneous preparation of an aqueous suspension of procaine-penicillin G, including: about 92.6 percent of procaine-penicillin G and about 7.4 percent of phospholipids, the phospholipids containing not more than one nitrogen atom being at least in part coated on the procaine-penicillin G particles, said composition being of a particle size sufficiently small to pass a sixty-mesh screen.

6. A dry composition suitable for the extemporaneous preparation of an aqueous suspension of procaine-penicillin, including: procaine-penicillin particles coated at least in part with lecithin.

References Cited in the file of this patent

UNITED STATES PATENTS

| Number | Name | Date |
|---|---|---|
| 1,741,786 | Magat | Dec. 31, 1929 |
| 2,055,083 | Kline | Sept. 22, 1936 |
| 2,138,546 | High | Nov. 29, 1938 |
| 2,449,039 | Libby | Sept. 7, 1948 |
| 2,515,898 | Rhodehamel | July 18, 1950 |

FOREIGN PATENTS

| Number | Country | Date |
|---|---|---|
| 107,587 | Austria | Oct. 25, 1927 |

OTHER REFERENCES

American Druggist, June 1948, p. 105.

"Modern Drug Encyclopedia and Therapeutic Index," Howard, 4th ed., January 1949, pp. 227 and 949.

"Modern Drugs," July 1949, pp. 149 and 164.

U. S. Dispensatory, 23rd ed. (1943), p. 1423.

Armstrong: "Prolongation of the Action of Penicillin After Intramuscular Injection." Proc. Soc. Exptl. Biol. and Med., January 1945, pp. 74–76.